(12) United States Patent
Nichols et al.

(10) Patent No.: US 6,262,834 B1
(45) Date of Patent: Jul. 17, 2001

(54) WIDEBAND SINGLE SIDEBAND MODULATION OF OPTICAL CARRIERS

(75) Inventors: Lee T. Nichols, Springfield; Ronald D. Esman, Burke, both of VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/511,231

(22) Filed: Feb. 23, 2000

(51) Int. Cl.[7] ............................. G02B 26/08; G02B 26/00; G02F 1/01; G02F 1/035
(52) U.S. Cl. ............................. 359/301; 359/238; 385/1; 385/3
(58) Field of Search ...................................... 359/279, 276, 359/246, 302, 583; 385/1, 2, 3, 6, 8

(56) References Cited

U.S. PATENT DOCUMENTS

| | | | |
|---|---|---|---|
| 4,634,852 | * 1/1987 | Shaw | 250/227 |
| 4,705,399 | * 11/1987 | Graindorge et al. | 356/464 |
| 4,842,358 | * 6/1989 | Hall | 385/12 |
| 5,301,058 | * 4/1994 | Olshansky | 359/188 |
| 5,880,870 | 3/1999 | Sieben et al. | 359/181 |
| 5,999,300 | * 12/1999 | Davies et al. | 359/183 |
| 6,169,824 | * 1/2001 | Sigogne et al. | 385/3 |
| 6,211,996 | * 4/2001 | Fuse | 359/278 |

OTHER PUBLICATIONS

Frankel et al., Optical Single–Sideband Suppressed–Carrier Modulator for Wide–Band Signal Processing; J. of Lightwave Techn.; vol. 16, No. 5.; pp. 859–863; 1998.

* cited by examiner

Primary Examiner—Ricky Mack
Assistant Examiner—Gary O'Neill
(74) Attorney, Agent, or Firm—John J. Karasek; Charles J. Stockstill (57) ABSTRACT

The wideband single-sideband modulator generates single-sideband (SSB) modulation with suppressed carrier utilizing traveling-wave $LiNbO_3$ modulators in a Sagnac loop. In the wideband single-sideband modulator, optical light from a linearly-polarized source is injected into polarization-maintaining fiber (PolMF) where it is split equally via a polarization-maintaining (PolM) directional fiber coupler, resulting in counterpropagating lightwaves in a Sagnac loop. These counterpropagating waves are $\pi/2$ out of phase due to the action of the coupler and remain so when they return to the coupler because they travel equal distances around the loop. Because the coupler is a reciprocal device, if the waves return to the coupler with equal amplitudes, they will recombine and exit the original port toward the polarized light source. The technique achieves true carrier cancellation over a range of radio frequency (RF) power levels, thereby serving as an enabling architecture for photonically-remoted ultrawide-band single-sideband suppressed-carrier (SSB-SC) modulated links.

10 Claims, 7 Drawing Sheets

WIDEBAND SINGLE SIDEBAND MODULATION OF OPTICAL CARRIERS

BACKGROUND OF THE INVENTION

1. Field of the Invention

This invention pertains generally to radio frequency (RF) transmission over optical carriers and more specifically to the generation of single sideband signals with suppressed carrier over a wide RF bandwidth for transmission over optical fibers.

2. Description of the Related Art

In electronic communications, single sideband (SSB) transmission is a well-known technique for reducing bandwidth and power requirements as well as "fading" due to dispersive transmission environments. When combined with carrier suppression (SC), this technique can enhance link gain in an amplified system. These benefits can be similarly realized in photonic links where RF signals are multiplexed onto an optical carrier and transmitted via a fiber optic cable, which has advantages over coaxial cable in terms of bandwidth, incremental loss, and electromagnetic interference (EMI) immunity. For micro- and millimeter-wave modulation frequencies, SSB becomes a useful way of overcoming fiber chromatic-dispersion effects (Fading in the fiber) while also suggesting new applications outside communications. (SEE, Smith et al., OVERCOMING CHROMATIC-DISPERSION EFFECTS IN FIBER-WIRELESS SYSTEMS INCORPORATING EXTERNAL MODULATORS, IEEE Trans. Microwave Theory Tech., Vol. 45, pp. 1410–1415, 1997.)

Figure 1A:
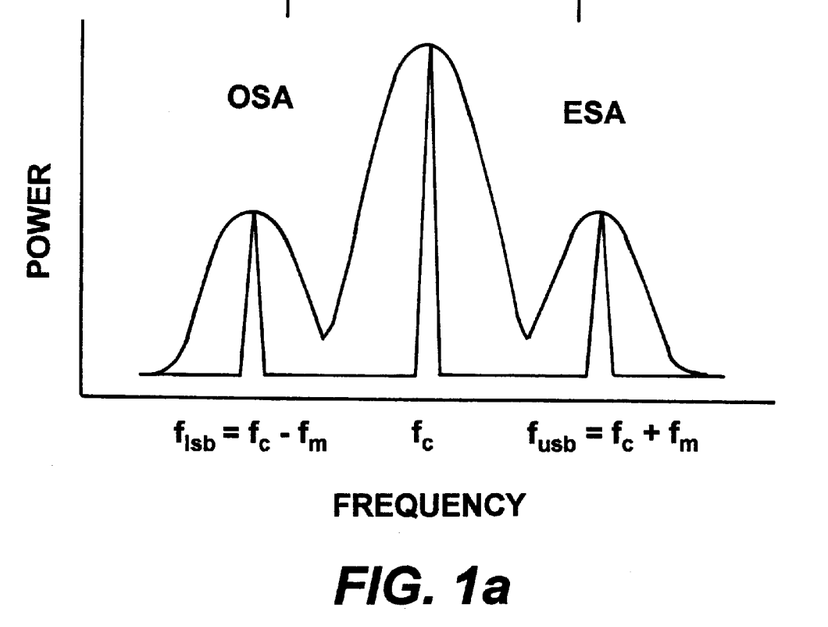
FIG. 1a shows an output power spectrum for phase or amplitude double sideband modulation.
Figure 1B:
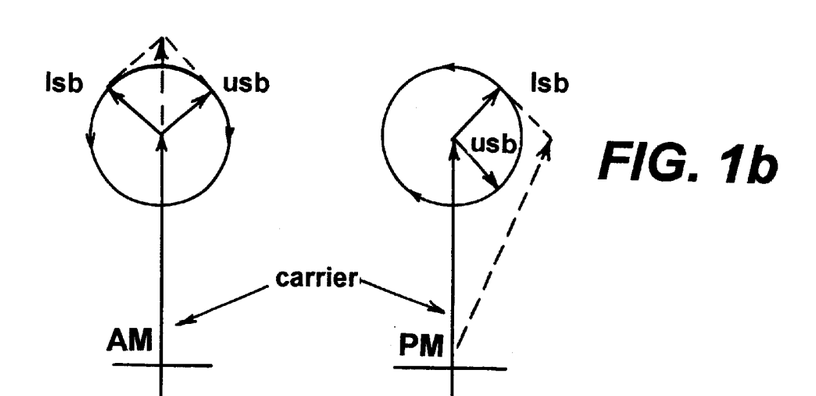
FIG. 1b shows the phase relationship between the three spectral peaks depending upon modulator bias and the relative phase of the RF input.

From communications theory, it is well known that a small-signal phase- or amplitude-modulated (PM or AM) carrier will appear on a spectrum analyzer as shown in FIG. 1a. This double sideband (DSB) spectrum can be easily generated using a laser and an electro-optic phase or amplitude modulator (two phase modulators combined in a Mach-Zehnder configuration) driven by an RF generator. In a Mach-Zehnder modulator, depending upon modulator bias and the relative phase of the RF inputs, the phase relationship between the three peaks can be a combination of those relationships illustrated by the phasor diagram FIG. 1b. With the carrier as a reference phasor, the sidebands will rotate in opposite directions: if they are phased such that the total sideband phasor is always parallel or antiparallel to the carrier, then the result will be AM; if they are phased such that the total sideband phasor is always perpendicular to the carrier, then the result will be mostly PM with a small amount of AM. True PM is comprised of additional harmonic sidebands such that the resultant (carrier plus sidebands) actually swings in pendulum fashion with constant amplitude.

Chromatic dispersion is a well-known limitation on the transmission distance achievable in photonic (optical carrier-based) links. While recognized for some time as a problem for digital systems, recent interest has been driven by the wireless/mm-wave market. (SEE, Yonenaga et al., A FIBER CHROMATIC DISPERSION COMPENSATION TECHNIQUE WITH AN OPTICAL SSB TRANSMISSION IN OPTICAL HOMODYNE DETECTION SYSTEMS, IEEE Photon. Technol. Lett., Vol. 5, pp. 949–951, 1993; Smith et al., opcit., Hofstetter et al., DISPERSION EFFECTS IN OPTICAL MILLIMETER-WAVE SYSTEMS USING SELF-HETERODYNE METHOD FOR TRANSPORT AND GENERATION, IEEE Trans. Microwave Theory Tech., Vol. 43, pp. 2262–2269, 1995; Gliese et al., CHROMATIC DISPERSION IN FIBER-OPTIC MICROWAVE AND MILLIMETER-WAVE LINKS, IEEE Trans. Microwave Theory Tech., Vol. 44, pp. 1716–1724, 1996; and Park et al., ELIMINATION OF THE FIBRE CHROMATIC DISPERSION PENALTY ON 1550 NM MILLIMETER-WAVE OPTICAL TRANSMISSION, Electron. Lett. Vol. 33, pp. 512–513.) Dispersion D (in ps/km-nm) results in a differential phase delay $\phi=\pi D\lambda^2 Lf^2/c$ between one spectral component at wavelength $\lambda$ and another such that the difference increases linearly with distance L and quadratically with the frequency separation f. (See, Gliese, opcit.) Referring again to FIG. 1b, this means that the oscillation direction of the total sideband phasor rotates linearly with L, periodically transforming AM to PM and back. For an intensity-modulated direct-detection (IM-DD) link, this results in a sinusoidal variation of link gain with L. The frequency response at a particular length will also be sinusoidal with quadratically increasing "phase". (SEE, Smith and Park, opcit.)

If a SSB scheme is used to eliminate one of the sidebands, the other sideband will rotate alone, producing a combination of AM and PM of lesser amplitude. The phase-insensitive DD receiver will then recover the AM without the periodicities associated with carrier-to-sideband dispersion. It is noted that this is not generally a complete solution to the dispersion problem. If the single-sideband is sub-carrier modulated (SCM) or the optical carrier is baseband modulated with a large enough information bandwidth, the information itself will be "dephased" over the fiber length. (SEE, Hofstetter, and Yonenaga, opcit.) Over a large distance, the optical linewidth shared by the carrier and the sideband is also decorrelated resulting in increased phase noise. (SEE, Gliese, opcit.) There are a variety of optical techniques (e.g., chirped gratings, dispersion-compensating fiber) which can be applied to reduce this effect.

Some techniques for photonic SSB generation involve elimination of one sideband from a DSB output. These include using a fiber Bragg grating (FBG) notch filter or, in the case of baseband modulation, using a Mach-Zehnder-type filter with a ring resonator on one arm to obtain a sharp cutoff band-reject filter. (SEE, Park and Yonenaga. opcit.) Another technique treats the DSB-SC output of a null-biased Mach-Zehnder modulator (MZM) as a SSB output with twice the modulation frequency and utilizes a delay-line filter to separate and modulate only one sideband. (SEE, Hofstetter, opcit.) The difficulty with these techniques is that they require filter designs which are matched to the frequency separations of interest and are therefore limited in bandwidth.

Figure 2A:
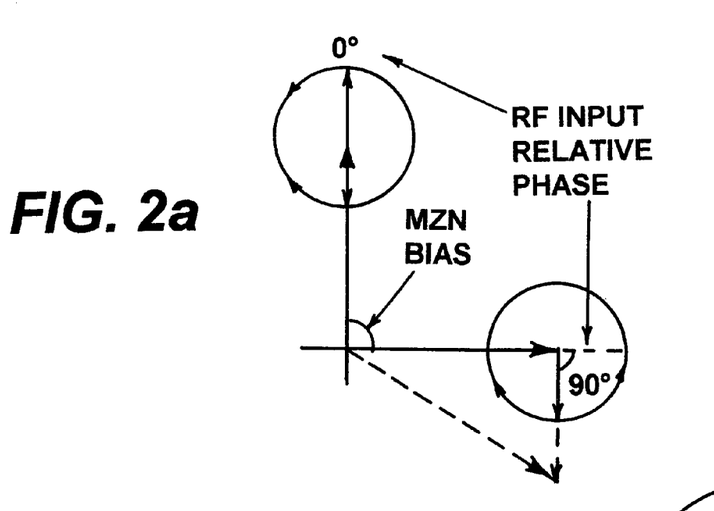
FIG. 2a shows where the carrier phasors correspond to each arm of a dual-drive Mach-Zehnder modulator, if the modulator is biased at quadrature and the RF drives are $\pi/2$ out of phase.
Figure 2B:
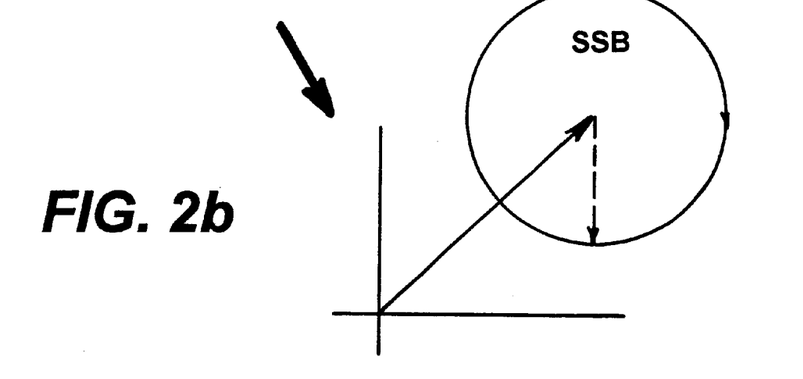
FIG. 2b shows the resultant phasor corresponding to the total output of the dual-drive Mach-Zehnder modulator, if the modulator is biased at quadrature and the RF drives are $\pi/2$ out of phase.

An alternative approach is to generate SSB output via cancellation within a dual-drive MZM. As shown in FIGS. 2a and 2b where the carrier phasors correspond to each arm of the device, if the modulator is biased at quadrature and the RF drives are $\pi/2$ out of phase, then either the upper or lower sidebands will cancel. This technique has been applied successfully to 80 km of fiber without dispersion-induced power degradation. (SEE, Smith, opcit.) This technique can be used with a traveling-wave modulator placed at the center of a polarization-maintaining (PolM) fiber loop joined by a PolM fiber coupler (a Sagnac interferometer) in order to supress the carrier as well. (SEE, Frankel et al., OPTICAL SINGLE-SIDEBAND SUPRESSED-CARRIER MODULATOR FOR WIDE-BAND SIGNAL PROCESSING; IEEE J. Lightwave Technol., Vol. 16, pp. 859–863, 1998.) The traveling-wave device generates sidebands more efficiently in the direction for which the RF signal and optical carrier are copropagating, thereby avoiding loop cancellation of the sidebands. Note that SSB with carrier can be recovered simultaneously (using a circulator) from the reflection port of the PolM fiber optic coupler. A problem with the single-MZM Sagnac SSB-SC configuration is that, because the sidebands propagate in the forward direction only, true carrier cancellation can only be achieved at a single RF power level, limiting the range of usable drive levels.

Integrated optical devices utilize materials which have been processed to create light-guiding regions with cross-sectional dimensions approximating the light wavelength as structures for generation, manipulation, and detection of light wave (SEE, Hutcheson et al., INTEGRATED OPTICAL CIRCUITS AND COMPONENTS, Dekker; New York; 1987.) As such a material, LiNbO3 is a common substrate because of its excellent electro-optical and waveguiding properties. In commercial optical modulators, this material is inlaid with waveguides typically using either an impurity in-diffusion or ion exchange method. Depending upon the surface orientation of the crystal substrate, electrodes are laid out directly above or above and beside the waveguide to influence the phase of the lightwaves propagating therein via the electro-optic effect. Such a device, with a single waveguide acts as an electrically-driven optical phase modulator and can be butt-coupled to fiber pigtails for integration into fiber optic systems. In other devices, the waveguides in these modulators are laid out in a splitter-parallel-combiner sequence to form a Mach-Zehnder interferometer, wherein the applied field influences the relative phase between the lightwaves propagating in the parallel arms. Thus, an applied electrical RF signal can induce an optical intensity fluctuation at the same frequency.

In order to improve the coupling efficiency of the electric field-optical field interaction at higher speeds, traveling-wave electrodes (microwave transmission lines parallel to the optical waveguides) are used instead of bulk (area, capacitor-like) electrodes. Designs which improve the propagation velocity match between the electrical and optical waves also enhance coupling efficiency and thereby improve modulation bandwidth. Because of the velocity match property, light in such devices is modulated more efficiently in one propagation direction than the other. For reference, this is called the preferred direction of the modulator.

Intensity (amplitude) modulators can be fashioned with a single RF drive or dual RF drives. In the former device, the electrodes are typically designed such that an antisymmetric field is generated across both parallel arms to produce a "push-pull" relative phase modulation which preserves the average relative phase rather than using an independent set of electrodes to drive each arm as in the latter device. However, the same effect can be generated in the dual-drive MZM by driving its RF inputs with the same signal 180 degrees out of phase. This "push-pull" modulation is preferred because phase disturbance is undersireable in an amplitude modulator.

SUMMARY OF THE INVENTION

The object of this invention is to provide an apparatus for generating single sideband optical signals with suppressed carrier over a wide radio frequency (RF) bandwidth and a wide range of RF power levels for use in optical fiber or free space transmission of electromagnetic and other information and for processing of RF signals.

These and other objectives are accomplished by the wideband single-sideband modulator for generating single-sideband (SSB) modulation with suppressed carrier which utilizes traveling-wave optical modulators (e.g., LiNbO$_3$ Mach-Zehnder) in a Sagnac loop. In the wideband single-sideband modulator, optical power from a polarized source is injected into polarization-maintaining fiber (PolMF) and it is split equally via a directional polarization-maintaining (PolM) fiber coupler, resulting in counterpropagating lightwaves in a Sagnac loop. These counterpropagating waves are $\pi/2$ out of phase due to the action of the coupler and remain so when they return to the coupler because they travel equal distances around the loop. Because the coupler is a reciprocal device, if the waves return to the coupler with equal amplitudes, they will recombine and exit the original input port toward the polarized light source. When light in each direction of the loop is properly phased and amplitude modulated, respectively, the optical carriers and one sideband (each) returning to the coupler will maintain equal amplitudes and exit the input port. Whereas, the other (single) sidebands will add in phase and exit the output port. The technique circumvents the problem of complete carrier cancellation over a range of radio frequency (RF) power levels, thereby serving as an enabling architecture for photonically-remoted ultrawide-band single-sideband suppressed-carrier (SSB-SC) modulated links.

DESCRIPTION OF THE PREFERRED EMBODIMENT

The invention described here is a technique for generating single-sideband (SSB) modulation with suppressed carrier which utilizes traveling-wave optical modulators in a Sagnac loop. The technique described herein circumvents the problem of complete carrier cancellation over a range of radio frequency (RF) power levels. This device serves as an enabling architecture for photonically-remoted ultrawideband single-sideband suppressed-carrier (SSB-SC) modulated links and signal processing.

Figure 3A:
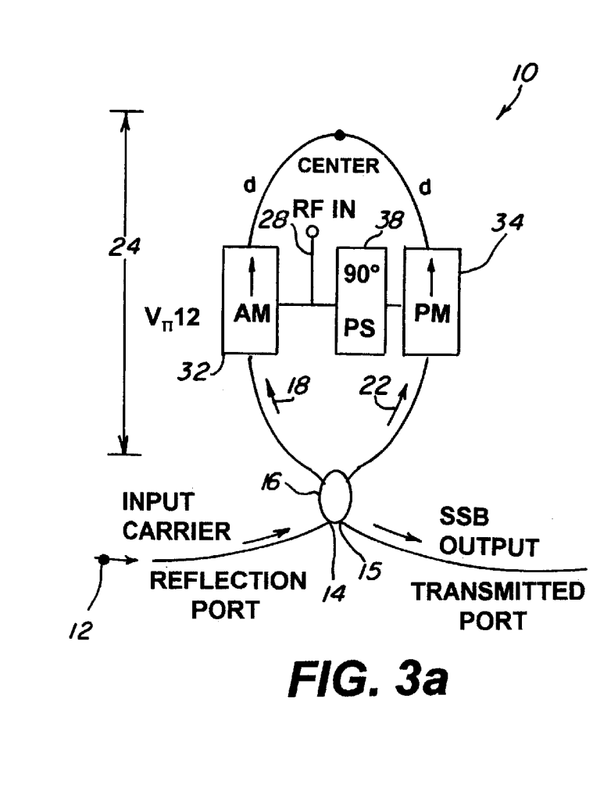
FIG. 3a shows a wideband Sagnac interferometer dual-modulator configuration for single-sideband generation with carrier suppression.

In the preferred embodiment 10, FIG. 3a, the wideband single-sideband modulator 10, optical power 12 from a polarized light source (not shown) is applied via polarization-maintaining fiber (PolMF) to a 3-db directional polarization-maintaining fiber optic coupler 16, a device well known to those skilled in the art, where it is split equally into CW-propagating and CCW-propagating lightwaves 18 and 22, respectively, in a Sagnac loop 24, or "loop mirror." These lightwaves 18 and 22 are $\pi/2$ out of phase due to the action of the coupler 16 and remain so when they return to the coupler 16 because they travel equal distances around the loop 24.

In the architecture shown in FIG. 3a, the CW- and CCW-propagating waves 18 and 22, respectively, are modulated equally, preferentially and respectively, by an amplitude modulator (AM) 32 and phase modulator (PM) 34, so that the technique works over a much larger range of RF power levels. It is important to note that the AM and PM modulators (ideally) only modulate the optical carrier in one direction; that is, in FIG. 3a the AM modulator 32 (ideally) modulates the optical signal traveling in the preferred direction (as denoted by the arrow) even though light travels through the modulator in both directions. The AM 32 and PM 34, preferably are LiNbO3 traveling wave modulators, however, other types of modulators may be utilized. In the AM 32, the CW-propagating optical signal 18 is intensity modulated by the radio frequency (RF) signal 28. It should be noted that a push-pull modulation is required here in order to ensure that no unintentional phase modulation (chirp) is added to the optical carrier. This is ensured by using a push-pull electrode design as discussed above and by applying the appropriate DC bias voltage 29 to bias the modulator at quadrature. The CCW-propagating optical signal 22 is synchronized with the CW-propagating signal 18 and phase modulated by the same RF signal 28 phase shifted 90° by passing through a 90° RF phase shifter 38, a device well known to those skilled in the art. The CW- and CCW-propagated waves 18 and 22, respectively, are recombined in the 3-dB directional coupler 16 where the carrier components of the two optical signals 18 and 22 cancel in the transmit direction, resulting in an optical signal 36, with the carrier suppressed, that exits through the transmitted port 36 and is applied to a using device (not shown).

Figure 3B:
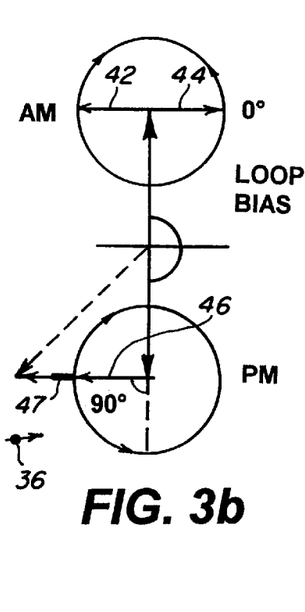
FIG. 3b shows a phasor diagram for the wideband Sagnac interferometer dual-modulator configuration for single-sideband generation with carrier suppression detailing the modulation phasors for each loop propagation direction.
Figure 3C:
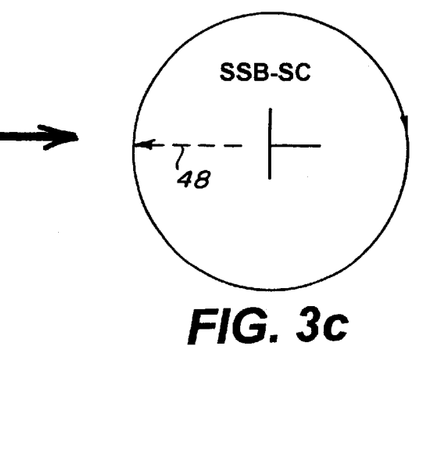
FIG. 3c shows a phasor diagram of the output from the Sagnac interferometer dual-modulator configuration for single-sideband generation with carrier suppression.

As the phasor diagram of FIG. 3b indicates, the action of the directional coupler 16 is such that the return waves from the loop 24 are combined with $\pi$ relative phase shift at the transmitted port 36. The relative phase of the inputs to the modulators 32 and 34 determined by the phase shifter 38 sets the timing of the modulation sidebands such that either the upper or lower (frequency) sidebands cancel. With this technique, carrier suppression of >30 dB is achievable because the magnitudes of the modulation phasors, indicated by the arrows 42 and 44 for the AM 32 and arrows 46 and 47 for the PM 34, are equivalent. The modulation phasors are colinear but out of phase as a result of the type of modulation applied to each. The vector addition of the phasors in FIG. 3b is such as to achieve a suppressed carrier single sideband signal 48, as shown in FIG. 3c.

Figure 4:
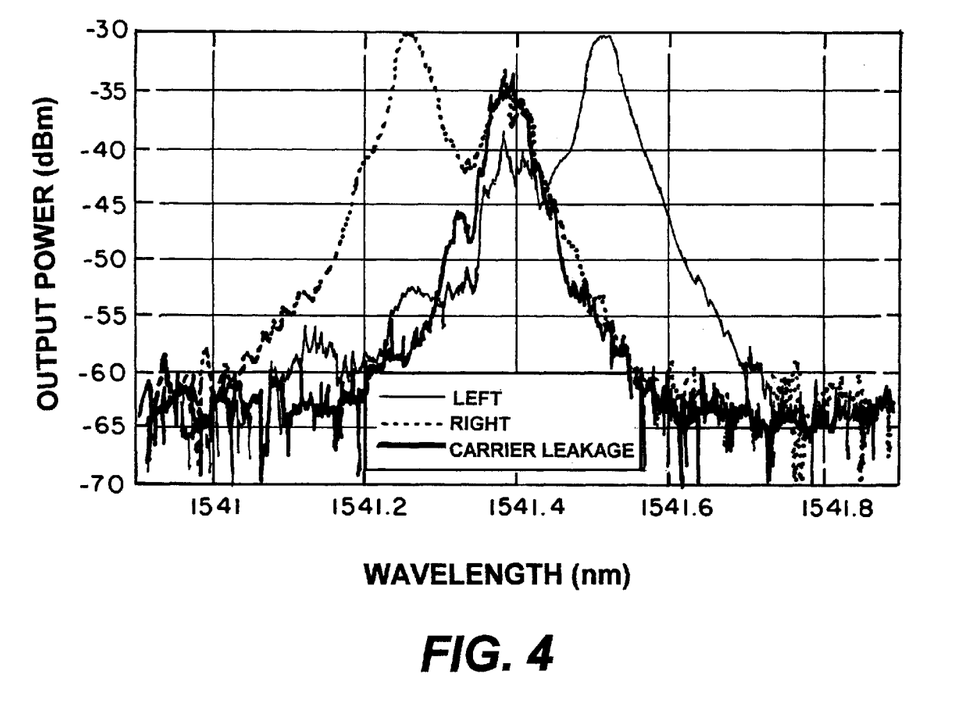
FIG. 4 shows the measured output of the architecture described in FIGS. 3a and 3c.

With this architecture, there are two essential frequency response characteristics. First, practical modulators exhibit unintentional modulation in the non-preferred, CCW-propagating direction. This unintentionally modulated signal can reduce or enhance the desired sideband outputted from the transmitted port depending on the relative phase of the signal. Since the modulators 32 and 34 are located a distance d from the center of the loop 24, the "non-preferred" unintentionally modulated waves from each modulator 32 and 34 arrive at the coupler 16 with phase relative to their "preferred" counterparts given by 2 df/v (v being the in-fiber group velocity and f the modulation frequency). As a result, the power in the transmitted sidebands varies sinusoidally with frequency. The null spacing $\pi v/d$ can be increased by placing the modulators 32 and 34 as close to the loop 24 center as possible, thereby reducing variation in the single sideband modulation with frequency. Second, the direction preference of the optical modulation by each modulator 32 and 34 decreases at lower frequencies (i.e., less than traveling-wave frequencies) and the modulation is more like that of a bulk modulator. Thus at lower frequencies, the overall response decreases due to sideband as well as carrier cancellation. FIG. 4 shows the measured output of the architecture described in FIG. 3a.

Figure 5A:
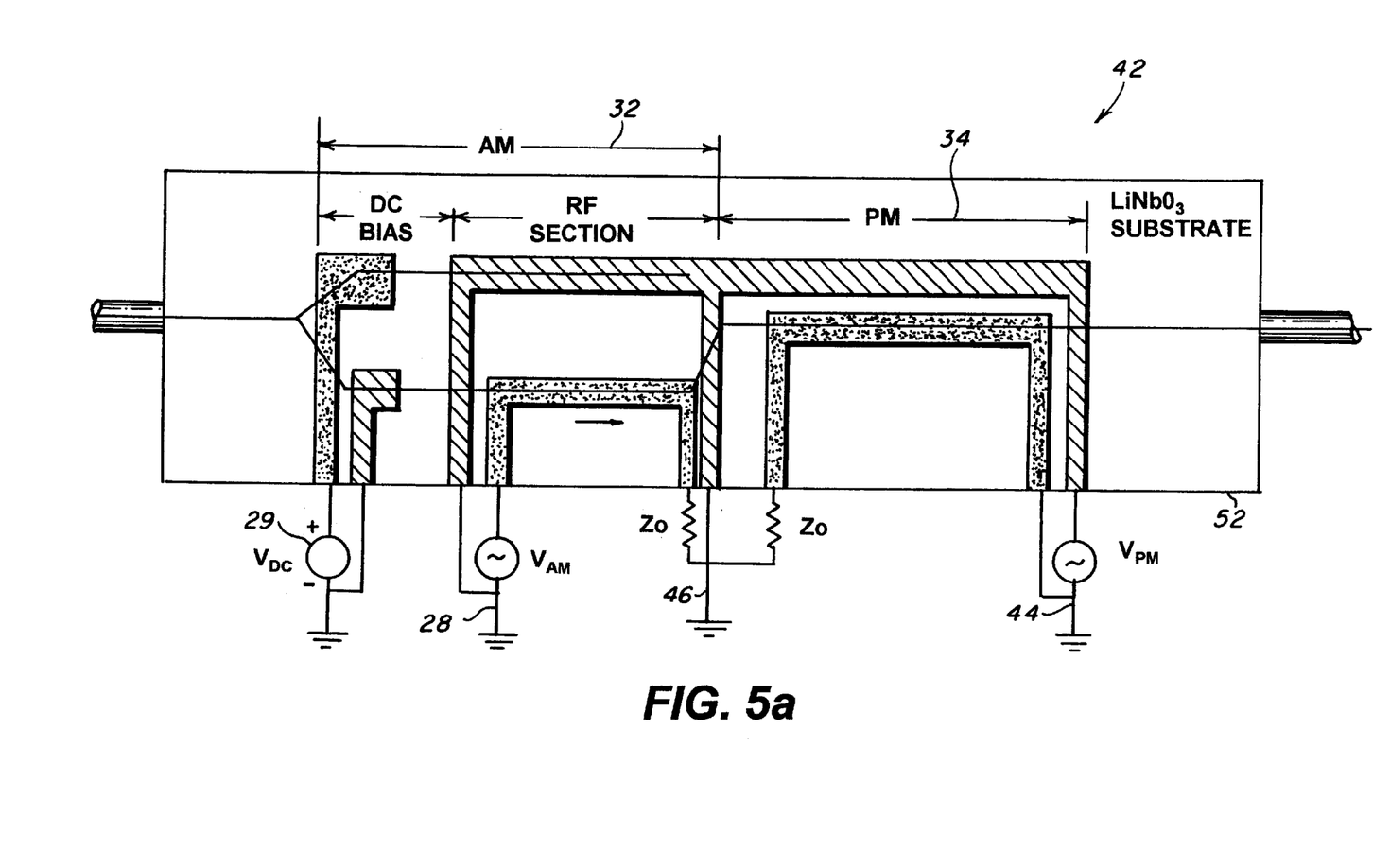
FIG. 5a shows a monolithic electro-optic apparatus wherein the phase and amplitude modulators are combined into a single device.
Figure 5B:
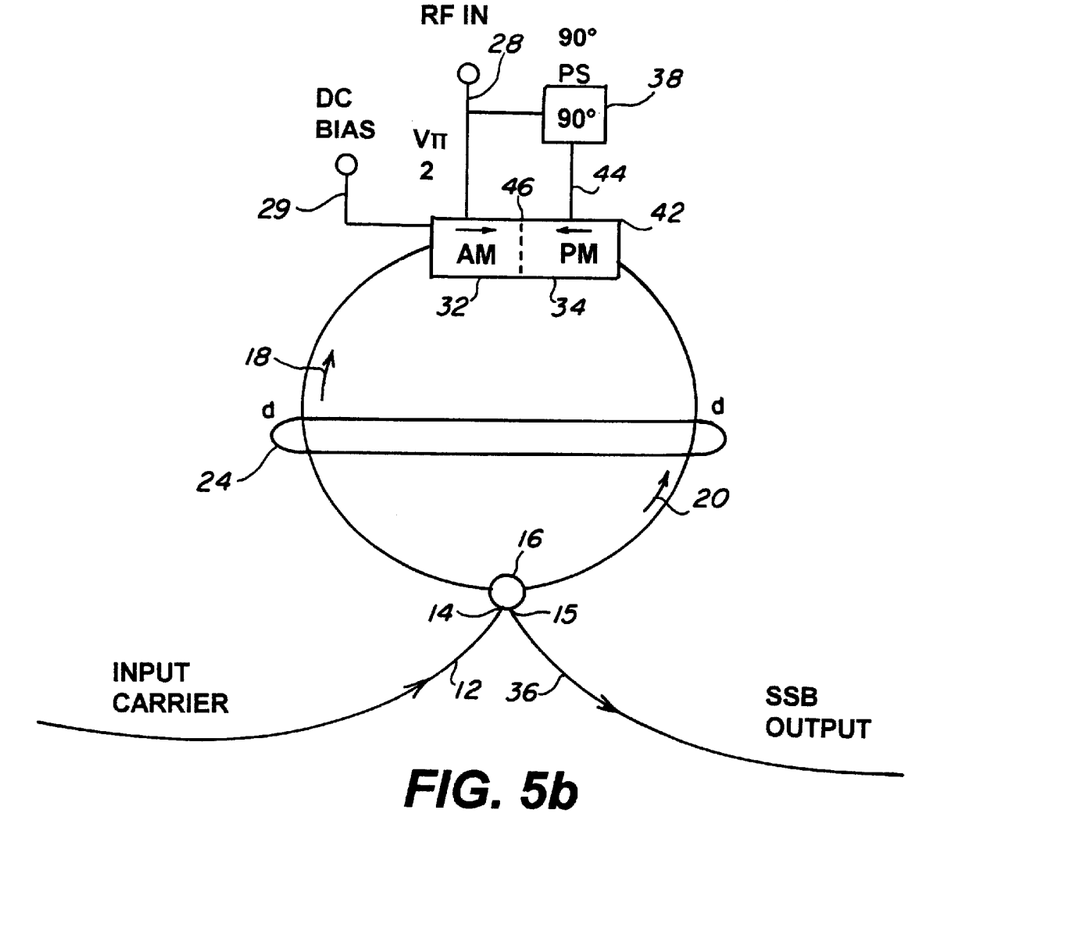
FIG. 5b shows a wideband Sagnac interferometer configuration wherein the device of FIG. 5a has been placed at the center of a Sagnac loop.

In an another preferred embodiment 20, as shown in FIGS. 5a and 5b, a phase modulator 34 and a "push-pull" intensity modulator 32 are combined on a single substrate 52 with their RF inputs 28 and 44 at opposite ends fed toward a common center electrode termination 46 in order to obtain a very small distance between effective modulation points-of-origin. As in FIG. 3a, the AM 32 must be placed in quadrature using DC bias 29. This device 42, detailed in FIG. 5a, is then placed at the center of the loop 24, as shown in FIG. 5b, to improve modulation bandwidth by reducing the delay differential between the "preferred" and "nonpreferred" modulation components of the counterpropagating waves in each modulator portion (AM 32 and PM 34) of the monolithic dual modulator 42.

Figure 6:
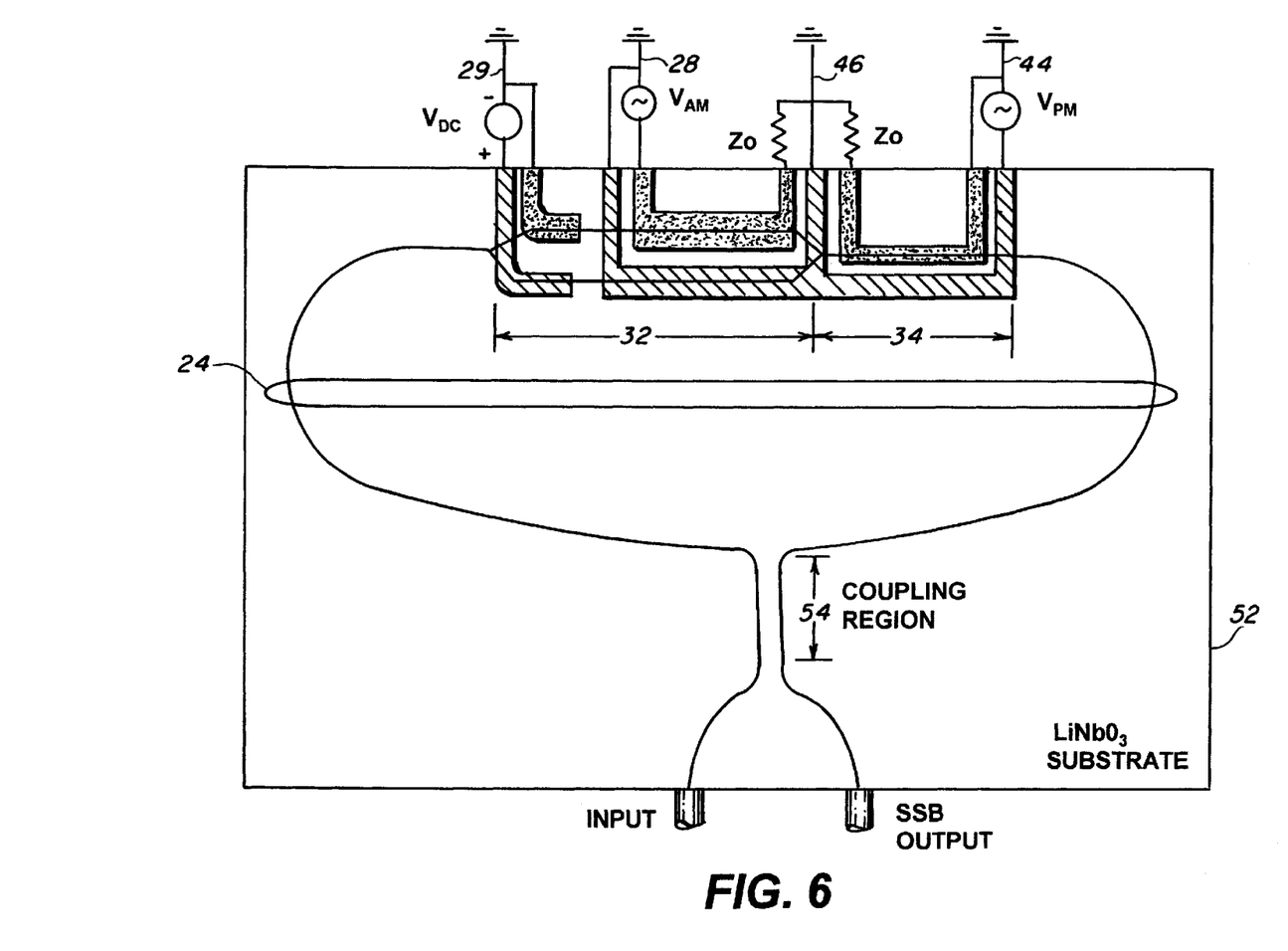
FIG. 6 shows a wideband Sagnac interferometer modulator configuration wherein the modulators are integrated as in FIGS. 5a and 5b and the fiber directional coupler used in the architecture is a LiNbO$_3$ waveguide directional coupler integrated into the substrate.

Further, in another preferred embodiment 30, as shown in FIG. 6, the modulators 32 and 34 as well as the Sagnac loop 24 may be integrated onto the modulator LiNbO3 substrate 52, reducing environmental influences on the amplitude characteristics of the loop 24. In such a device 30, the fiber directional coupler 16 used in the previous embodiment 20 is replaced by a $LiNbO_3$ waveguide directional coupler 54 integrated into the substrate 52. Note that the embodiments 10, 20, and 30 contain the same basic architecture with increasing levels of component integration (FIGS. 3a, 3b, and 3c; FIGS. 5a and 5b; and FIG. 6).

The advantages of the wideband single-sideband modulator include those of SSB-SC transmission itself, i.e., efficient use of available spectrum and power gain. In addition, the wideband single-sideband modulator has advantages associated with optical SS techniques such as the ability to combat chromatic dispersion, the ability to remotely sense and transmit microwave signals via optical fiber, and the ability to perform signal processing functions such as RF spectrally shifting or spectrally inverting microwave signals.

The wideband single-sideband modulator surpasses other optical SSB-SC techniques in terms of its instantaneous bandwidth, degree of bias stability provided by the loop architecture, and in its operation over large power ranges.

Although this invention has been described in relation to an exemplary embodiment thereof, it will be understood by those skilled in the art that still other variations and modifications can be affected in these preferred embodiments without detracting from the scope and spirit of the invention as described in the claims.

What is claimed is:

1. A wideband single-sideband modulator comprising:

a polarized light source applied to an optical system for receiving and transmitting said polarized light;

means for splitting said polarized light transmitted by the optical system into a first and second counterpropagating optical light wave in a Sagnac loop;

an electromagnetic signal to modulate the counterpropagating optical light signals;

means for intensity modulating said first optical light to produce an intensity modulated optical light with the electromagnetic signal;

means for shifting the phase of the electromagnetic signal 90°;

means for phase modulating said second optical light with the electromagnetic signal 90° out of phase so as to produce an optical signal whose phase modulation is 90° out of phase with the intensity modulation of the other optical signal; and means for combining the phase modulated optical signal 180° out of phase with the intensity modulated signal to produce a optical signal with a suppressed carrier.

2. A device, as in claim 1, wherein the optical system consists of optical fiber.

3. A device, as in claim 2, wherein the means for splitting said polarized light transmitted by the optical fiber into a first and second counterpropagating optical light is an optical splitter.

4. A device, as in claim 2, wherein the means for intensity modulating said first optical light to produce an intensity modulated optical light with the electromagnetic signal is a fiber coupled optical amplitude modulator.

5. A device, as in claim 4, wherein the optical amplitude modulator is a Mach-Zehnder interferometer.

6. A device, as in claim 1, wherein the means for shifting the phase of the electromagnetic signal 90° is a phase shifter.

7. A device, as in claim 1, wherein the means for phase modulating said second optical light with the electromagnetic signal 90° out of phase so as to produce an optical signal whose phase modulation is 90° out of phase with the intensity modulation of the other optical signal is an optical phase modulator.

8. A device, as in claim 1, wherein the means for combining the phase modulated optical signal 180° out of phase with the intensity modulated signal to produce a optical signal with a suppressed carrier is a combiner.

9. A method for suppressing the carrier in an optical signal comprising the steps of:

applying an optically polarized light to an optical circuit;

splitting said polarized light into a first and second counterpropagating optical light in a Sagnac loop;

applying an electromagnetic signal comprised of a carrier and sidebands to the counterpropagating optical light signals;

intensity modulating said first optical light with the electromagnetic signal to produce an intensity modulated optical light;

shifting the phase of the electromagnetic signal 90°;

phase modulating said second optical light with the electromagnetic signal 90° out of phase so as to produce an optical signal whose phase modulation is 90° out of phase with the intensity modulation of the other optical signal; and combining the phase modulated optical signal 180° out of phase with the intensity modulated signal to produce a optical signal with a suppressed carrier.

10. A wideband single-sideband modulator comprising:

a polarized light split into a first and second counterpropagating optical light applied an optical loop having an amplitude modulator and phase modulator responsive to the first and second counterpropagating optical light, respectively;

an electromagnetic signal comprised of a carrier and sidebands applied to the counterpropagating optical light signals;

said first optical light being modulated by the electromagnetic signal to produce an intensity modulated optical light;

a phase shifter for shifting the phase of the electromagnetic signal 90°;

said second optical light being phase modulating light with the phase shifted electromagnetic signal to produce an phase modulated optical signal whose phase modulation is 90° out of phase with the intensity modulation of the other optical signal; and a combiner for combining the phase modulated optical signal 180° out of phase with the intensity modulated signal to produce a optical signal with a suppressed carrier.

* * * * *